United States Patent [19]

Westbrook

[11] Patent Number: 4,457,183

[45] Date of Patent: Jul. 3, 1984

[54] TORQUE MEASURING DEVICE

[76] Inventor: Carl M. Westbrook, 1475 Gunlock Shores La., Minocqua, Wis. 54548

[21] Appl. No.: 368,685

[22] Filed: Apr. 15, 1982

[51] Int. Cl.³ ............................................. G01L 3/04
[52] U.S. Cl. ................................................ 73/862.32
[58] Field of Search ....................... 73/862.32, 862.19; 74/25, 56

[56] References Cited

U.S. PATENT DOCUMENTS 2,775,889  1/1957  Decker .......................... 73/862.32 X
3,710,618  1/1973  Pagel ................................ 73/862.32

Primary Examiner—Jerry W. Myracle
Attorney, Agent, or Firm—Larson and Taylor

[57] ABSTRACT

A device for measuring the torque on an elongate shaft which is twisted as the shaft is subjected to torque. An elongate tubing is located around the shaft and is attached at one end to the shaft. A flange member is located adjacent the opposite end of the tubing and includes an outer rim which is flexibly mounted to the shaft. A camming mechanism is located between the rim and the end of the elongate tubing so that the rim is axially deflected as the shaft twists under the torque relative to the free end of the elongate tubing. The axial deflection of the rim is measured and the torque on the shaft is determined by the magnitude of this deflection. The axial deflection is conveniently measured by measuring the effect on fluid flow out of a nozzle located adjacent to the rim.

14 Claims, 2 Drawing Figures

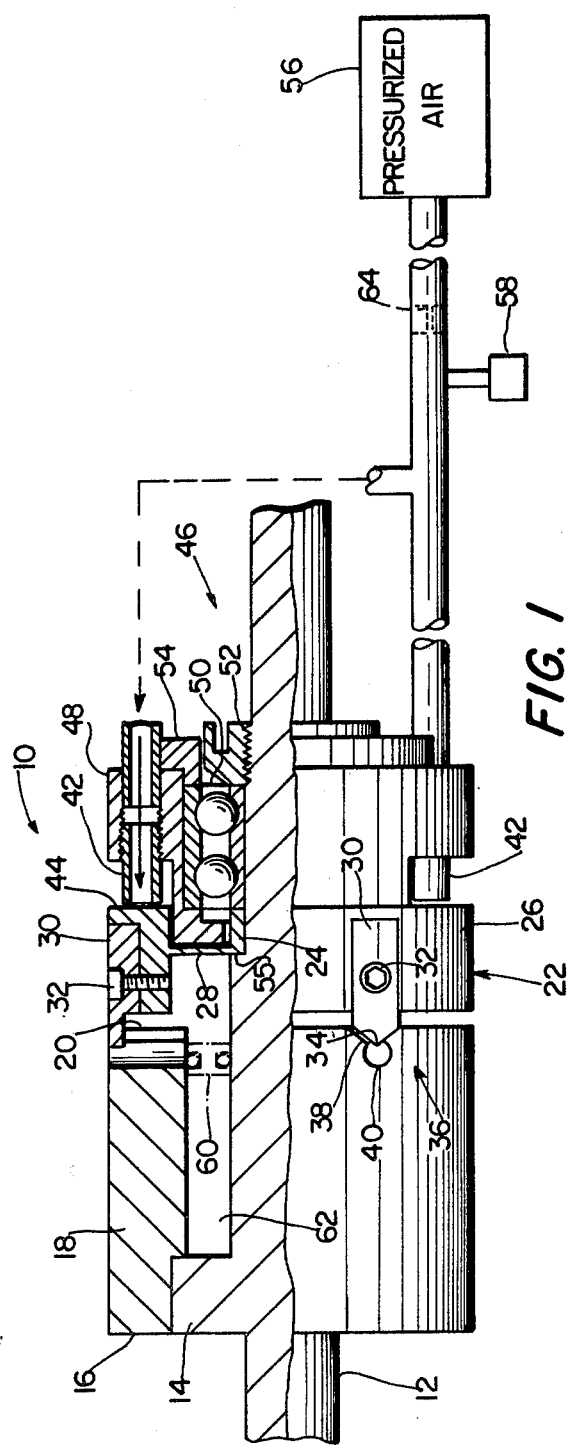
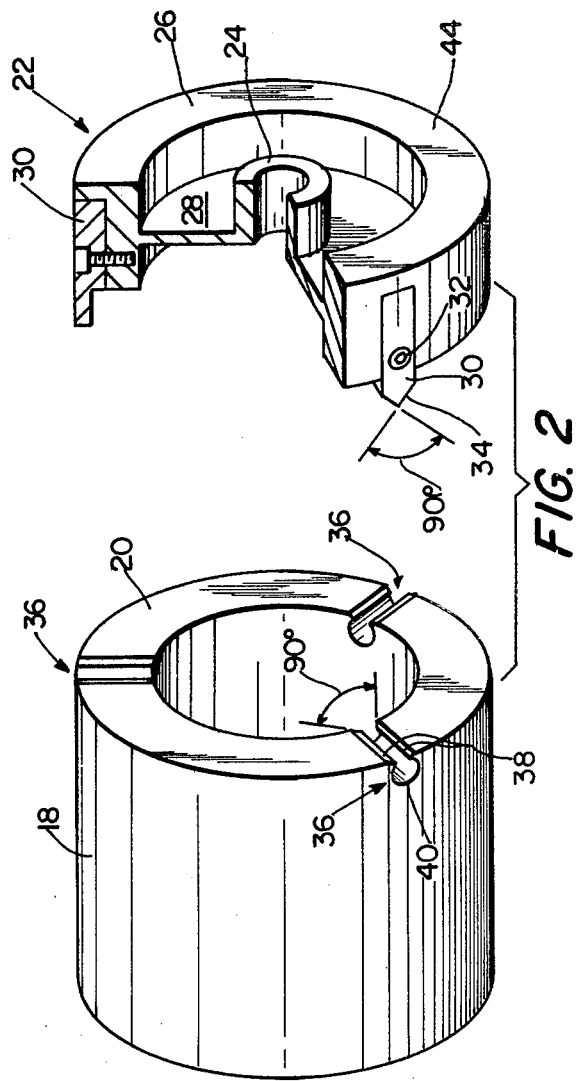

TORQUE MEASURING DEVICE

Field of the Invention

The present invention relates generally to devices for measuring the torque on a shaft, and more particularly to devices which measure the torque on a rotating shaft.

Background of the Invention

A number of devices have been disclosed in the prior art for measuring the torque on a rotating shaft. The use of a compressed air fluid flow which is affected by the deflection of a shaft to determine the torque on the shaft has also been disclosed. Typical devices of this type are disclosed in the following U.S. Pat. Nos. 3,273,387 (Westbrook et al.), 3,154,941 (Westbrook), 3,906,786 (Westbrook), 2,491,251 (Chinn), and 3,069,902 (Crosby). In the devices disclosed in these patents, a surface undergoes angular deflection as the shaft is twisted by the torque and this angular deflection of the surface causes the size of a gap through which the fluid flows to vary.

A torque meter in which the torsional deflection of a shaft during rotation is translated into axial movement of a sleeve against a spring is disclosed in U.S. Pat. No. 3,045,479 (Stein et al.). The axial movement of the sleeve is caused by contact between mating helical surfaces. The axial movement of the sleeve causes the end of the sleeve to engage a roller which is eccentric to the axis of a bar. The movement of this bar is used to determine the torque on the rotating shaft.

While prior art devices have been satisfactory in determining the torque on a rotating shaft, the need for a simple, easy to manufacture, and easy to assemble torque measuring device still exists. In addition, a device which is able to withstand substantial overloading is also needed.

Summary of the Invention

An apparatus for measuring the torque on a rotating elongate shaft which is twisted as the shaft is subjected to torque is disclosed. The torque measuring apparatus has few sliding parts, is simple, is easy to manufacture, and is easy to assemble. The device includes an elongate tubing which surrounds a portion of the shaft and is secured to the shaft at one end so that the other end is freely located about the shaft. A flange member is also located on the shaft adjacent the free end of the tubing. The flange member includes an outer rim which is flexibly connected to the shaft. Interconnecting the rim and the free end of the tubing is a cam mechanism. When the shaft is twisted by torque, the free end of the tubing moves relative to the rim causing the rim to be deflected. The magnitude of this deflection is proportional to the torque and is measured by a suitable mechanism. From this measurement, the torque on the shaft is thus easily determined.

In the preferred embodiment of the present invention, the deflection of the rim is measured by determining the effect on fluid flow from a nozzle located immediately adjacent the rim. In this preferred embodiment, there are three cam mechanisms located symmetrically about the rim and two discharge nozzles located adjacent the rim. Conveniently, the pressure of the fluid before discharge, which is affected by the distance between the nozzles and the rim, is used to determine the torque.

The torque measuring device of the present invention is designed to measure the torque on the shaft when the shaft is twisted clockwise or counterclockwise. In order to accomplish this and to reduce hysteresis, the mating parts of the cam mechanism, which include a cam bar and a cam surface, are positively biased together by the flexible connection to the rim. Where the bias force exerted by the flexible connection is increased during overloading, the torque measuring device is able to withstand 100% overloading. However, where the bias force exerted by the flexible connection is decreased during overloading, significant overloading of 200% or more can readily be tolerated without damage to the torque measuring device.

Other features and advantages of the present invention are stated in or are apparent from the detailed description of presently preferred embodiments of the invention found hereinbelow.

Brief Description of the Drawings

FIG. 1 is a partially cutaway plan view of the torque measuring apparatus of the present invention.

FIG. 2 is an expanded perspective view of the axial deflection mechanism depicted in FIG. 1.

Detailed Description of the Preferred Embodiments

With reference now to the drawings in which like numerals represent like elements throughout all the views, a torque measuring apparatus 10 which measures the torque applied to a shaft 12 is depicted in FIG. 1. Shaft 12 includes a greatly enlarged portion 14 to which the distal end 16 of a length of elongate tubing 18 is securely attached. In this manner, the proximal end 20 of tubing 18 is freely supported around shaft 12. Located immediately adjacent to proximal end 20 is a flange member 22.

As shown in additional detail in FIG. 2, flange member 22 includes a hub 24 which is securely attached to shaft 12. Surrounding hub 24 is a rim 26. Connecting rim 26 to hub 24 is a flexible connector such as disc 28. Preferably, hub 24, rim 26, and disc 28 are integrally formed and are preferably machined from one piece.

Adjustably embedded in the outer surface of rim 26 are three cam bars 30. As shown, cam bars 30 are located symmetrically about rim 26 and are immovably secured to rim 26 by suitably attaching means 32 such as a screw. Cam bars 30 extend from rim 26 towards 18 and include a pointed tip 34. As indicated, tip 34 is bevelled to form a preferably 90° surface. Tips 34 of cam bars 30 extend into cam surfaces 36 located in proximal end 20 of tubing 18. Cam surfaces 36 are located to receive tips 34. In addition, cam surfaces 36 are provided with two 90° incline portions 38 which lead into a cutout portion 40.

As shown in FIG. 1, two air nozzles 42 are spaced slightly from side surface 44 of rim 26. Air nozzles 42 are nonrotatably mounted relative to shaft 12 by a bearing means 46. Bearing means 46 includes a bearing housing 48, bearing device 50 bearing lock nut 52, and a bearing end cap 54. It should be noted that lock nut 52 is conveniently used to secure hub 24 to shaft 12 as the force exerted by lock nut 52 pushes both the inner race of housing 50 and hub 24 against shoulder 55 of shaft 12. Both air nozzles 42 are fluidly connected to a suitable source 56 of pressurized air. Pressurized air is delivered to nozzles 42 through a flow restriction 64 (shown in phantom). A pressure measuring device 58 measures the pressure in the line delivering pressurized air to air nozzles 42 after restriction 64.

Under some operating conditions, extremely rapid changes in temperature along shaft 12 may occur. Where an extremely accurate torque measurement is required, the thermal gradient existing along shaft 12 and along tubing 18 would adversely affect the torque measurement. In order to eliminate the effects of thermal gradients in such situations, an O-ring seal 60 can optionally be provided near the proximal end 20 of tubing 18. Filling the area between O-ring seal 60 and enlarged portion 14 is a heat conducting fluid 62. Heat conducting fluid 62 then rapidly equalizes the temperature along shaft 12 and tubing 18 to eliminate almost all of any thermal error caused by rapid changes in temperature.

When torque measuring apparatus 10 is assembled as shown in FIG. 1, it should be noted that in the torque free position pointed tips 34 of cam bars 30 are set by attaching means 32 so that each tip 34 is exerting a small force against one portion 38 of each cam surface 36 in tubing 18. This force is provided by locating hub 24 of flange member 22 so that disc 28 is bent slightly causing pointed tips 34 to push against one portion 38 of each cam surface 36. For example, where the area of contact between pointed tip 34 and an associated cam surfce 36 is 1/64th of a square inch, approximately four pounds of force, or 75 psi a piece, can be exerted by the three cam bars 30 on tubing 18. This prestressed condition at zero torque gives torque measuring apparatus 10 the capability to return from a reading of torque in either direction with a minimum of hysteresis.

In operation, torque measuring apparatus 10 functions in the following manner. As shaft 12 is twisted by an applied torque, axial positions along shaft 12 are angularly deflected with respect to one another. In particular, enlarged portion 14 is angularly deflected with respect to hub 24 of flange member 22. As elongate tubing 18 is secured to shaft 12 only at enlarged portion 14, the angular displacement of enlarged portion 14 relative to hub 24 is the same as the angular displacement of proximal end 20 of tubing 18 relative to rim 26 of flange member 22. Therefore, as proximal end 20 of tubing 18 is displaced angularly from rim 26 of flange member 22, cam surfaces 36 exert a force on pointed tips 34 of cam bars 30. This force causes pointed tips 34 to move along one portion 38 of cam surfaces 36. As elongate tubing 18 is relatively nondeformable, whereas rim 26 is relatively easily movable due to the flexibility of disc 28, this force causes rim 26 to move toward or away slightly from proximal end 20.

Pressurized air source 56 continuously delivers air to air nozzles 42 through a suitable restriction 64 located in the fluid path upstream from pressure measuring device 58. For example, source 56 can exert a pressure of 18.5 PSIG prior to the restriction. Then, the pressure in the fluid conduit leading to air nozzles 42 as measured by pressure measuring device 58 is approximately 6 PSIG when shaft 12 is in the torque free position and such that side surface 44 of rim 26 is at the torque free position from air nozzles 42. Thus, a shaft 12 undergoes torque and rim 26 is axially deflected, the pressure in the fluid line leading to air nozzles 42 rises or falls because the gap between air nozzles 42 and side surface 44 through which the air escapes is reduced or increased. As the axial deflection of rim 6 is directly proportional to the torque on shaft 12, the measurement of pressure by pressure measuring device 58 provides a direct indication of the axial deflection of rim 26 and hence provides a direct indication of the torque on shaft 12.

It should be noted that the gap between tip 34 and the other portion 38 against which tip 34 is not positively biased is relatively small, for example 0.008 inch. When tubing 18 is twisted in the direction causing tips 34 to move away from cutout portions 40, the force exerted in disc 28 increases and the gap between nozzles 42 and rim 26 decreases. Overloads of 100% causing increasing force to be exerted on disc 28 are easily withstood in this direction. When tubing is twisted in the other direction causing tips 34 to move towards cutout portion 40, the force exerted on disc 28 decreases and the gap between nozzles 42 and rim 26 increases. Significant overloads of 200% causing decreasing force to be exerted on disc 28 are then easily withstood in this direction.

Although the present invention has been described using a pneumatic indication means to determine the deflection of rim 26 caused by the torque of shaft 12, it should be appreciated that other indicating means can easily be used as well. For example, optical proximity detectors making use of fiber optic sensing probes which are well known in the art could be used. In addition, variable reluctance proximity transducers are also available and would perform the desired function as well. In the preferred embodiment, three cam bars and mating cam surfaces have been utilized because it is easier to properly locate rim 26 equidistant from proximal end 20 of tubing 18 where only three points are involved. However, a fewer or greater number of cam bars and mating surfaces can easily be used. Similarly, while two air nozzles have been shown, a greater or lesser number of air nozzles can be used. It should also be appreciated by those of ordinary skill in the art that air nozzles 42 must be precisely located with respect to side surface 44. To accomplish this, air nozzles 42 are conveniently located in bearing housing 48 by finely threaded surfaces so that adjustment is easily accomplished.

Thus, while the invention has been described in detail with respect to exemplary embodiments thereof, it will be understood by those of ordinary skill in the art that these and other variations and modifications may be effected in the exemplary embodiments within the scope and spirit of the invention.

I claim:

1. An apparatus for measuring the torque on a rotating elongate shaft which is twisted as the shaft is subjected to torque comprising:

an elongate tubing having a distal end and a proximal end which surrounds a portion of the shaft, said tubing being secured to the shaft so that a portion of said tubing adjacent to said proximal end is freely located about the shaft;

a flange member located adjacent the proximal end of said tubing having a central hub connected to the shaft, an outer rim, and a flexible connecting means for connecting said rim to said hub;

cam means interconnecting said rim of said flange member and said proximal end of said tubing for deflecting said rim axially of said hub relative to the force exerted by said flexible connecting means when the shaft is twisted by torque;

and a torque determining means which is stationary with respect to the rotation of the shaft for measuring the axial deflection of said rim against the force of said flexible connecting means caused by the twisting of the shaft whereby the torque is determined by the magnitude of the deflection of said rim.

2. A torque measuring apparatus as claimed in claim 1 wherein said measuring means includes a source of fluid under pressure, a fluid discharge nozzle through which said fluid is passed, said discharge nozzle being spaced slightly from said rim so that the axial deflection of said rim varies the flow of the fluid out of said nozzle, and a fluid measuring means for measuring the affect on fluid flow of the axial deflection of said rim.

3. A torque measuring apparatus as claimed in claim 2 wherein there are a plurality of said discharge nozzles and said nozzles are mounted about the shaft by a bearing.

4. A torque measuring apparatus as claimed in claim 3 wherein said fluid measuring means measures the pressure of the fluid before discharge from said nozzles.

5. A torque measuring apparatus as claimed in claim 1 wherein said cam means includes a plurality of cam bars located symmetrically about said rim each said cam bar extending to at least one mating cam surface located at the proximal end of said tubing.

6. A torque measuring apparatus as claimed in claim 5 wherein there are three of said cam bars and three of said mating cam surfaces.

7. A torque measuring apparatus as claimed in claim 5 wherein said cam means causes said rim to be deflected when the shaft is twisted in either direction.

8. A torque measuring apparatus as claimed in claim 7 wherein said flexible connecting means biases said cam bars against respective said cam surfaces when said shaft is not subject to torque so that said cam bars always positively engage said respective cam surfaces.

9. A torque measuring apparatus as claimed in claim 8 wherein the force exerted by said flexible connecting means against said rim is decreased as the shaft is twisted in one direction whereby the torque measuring device is readily able to withstand significant overloading in that direction.

10. A torque measuring apparatus as claimed in claim 9 wherein the force exerted by said flexible connecting means against said rim is increased as the shaft is twisted in the other direction and the torque measuring device is able to withstand overloading in that direction.

11. A torque measuring apparatus as claimed in claim 5 wherein said cam bars are adjustably secured to said rim.

12. A torque measuring apparatus as claimed in claim 1 wherein said tubing is attached to the shaft at the distal end of said tubing.

13. A torque measuring apparatus as claimed in claim 1 wherein said flexible connecting means is a thin disc integrally formed with said rim and said hub.

14. A torque measuring apparatus as claimed in claim 1 further including a seal between the proximal end of said tubing and said shaft and a heat conducting fluid located in the area enclosed by said seal between said tubing and said shaft whereby thermal gradients along the shaft are substantially eliminated.

* * * * *